(12) United States Patent
Arai

(10) Patent No.: US 10,017,643 B2
(45) Date of Patent: Jul. 10, 2018

(54) CORONA-RESISTANT RESIN COMPOSITION, METHOD FOR DEVELOPING CORONA RESISTANCE OF RESIN COMPOSITION, AND CORONA-RESISTANT MEMBER

(71) Applicant: POLYPLASTICS CO., LTD., Tokyo (JP)

(72) Inventor: Hiroki Arai, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 104 days.

(21) Appl. No.: 15/029,697

(22) PCT Filed: Oct. 24, 2014

(86) PCT No.: PCT/JP2014/078340
§ 371 (c)(1),
(2) Date: Apr. 15, 2016

(87) PCT Pub. No.: WO2015/064499
PCT Pub. Date: May 7, 2015

(65) Prior Publication Data
US 2016/0280917 A1 Sep. 29, 2016

(30) Foreign Application Priority Data

Oct. 29, 2013 (JP) ................................. 2013-224190

(51) Int. Cl.
| | | |
|---|---|---|
| C08L 81/04 | (2006.01) | |
| C08J 3/20 | (2006.01) | |
| C08L 67/02 | (2006.01) | |
| C08L 101/00 | (2006.01) | |
| C09D 181/04 | (2006.01) | |
| C08G 77/442 | (2006.01) | |

(52) U.S. Cl.
CPC ............. *C08L 81/04* (2013.01); *C08J 3/20* (2013.01); *C08L 67/02* (2013.01); *C08L 101/00* (2013.01); *C09D 181/04* (2013.01); *C08G 77/442* (2013.01); *C08L 2201/08* (2013.01)

(58) Field of Classification Search
CPC ...... C08L 81/04; C09D 181/04; C09D 183/04
See application file for complete search history.

(56) References Cited

U.S. PATENT DOCUMENTS

| 7,923,497 B2 | 4/2011 | Tan et al. |
| 2007/0117913 A1 | 5/2007 | Tan et al. |
| 2008/0293864 A1 | 11/2008 | Tan et al. |

FOREIGN PATENT DOCUMENTS

| JP | S59-79903 A | 5/1984 |
|---|---|---|
| JP | H07-278413 A | 10/1995 |
| JP | 8-231852 A | 9/1996 |
| JP | 08 291253 | * 11/1996 |
| JP | H08-291253 A | 11/1996 |
| JP | 9-328617 A | 12/1997 |
| JP | H11-53943 A | 2/1999 |
| JP | H11-150848 A | 6/1999 |
| JP | 2002-107402 | 4/2002 |
| JP | 2002-161200 A | 6/2002 |
| JP | 2005-290283 A | 10/2005 |
| JP | 2007-119527 A | 5/2007 |
| JP | 2007-182554 A | 7/2007 |
| JP | 2010-90260 A | 4/2010 |
| JP | 2011-111468 A | 6/2011 |
| JP | 2011-148917 A | 8/2011 |
| JP | 2013-155272 | 8/2013 |
| JP | 2014-072335 A | 4/2014 |
| JP | 5914759 B2 | 5/2016 |
| WO | 2014/065376 A1 | 5/2014 |
| WO | 2014/065377 A1 | 5/2014 |

OTHER PUBLICATIONS

JP 08 291253 machine translation (1996).*
Notice of Reason(s) for Refusal in Counterpart Patent Appl. No. 2015-518706, dated Jul. 14, 2015, with partial English translation.
Decision of Refusal in Counterpart Patent Appl. No. 2015-518706, dated Oct. 27, 2015, with partial English translation.
International Search Report in application No. PCT/JP2014/078340, dated Jan. 6, 2015.
International Preliminary Report on Patentability in application No. PCT/JP2014/078340, dated May 3, 2016.
Japanese Office Action issued with respect to Application No. 2016-013335, dated Oct. 4, 2016.

* cited by examiner

*Primary Examiner* — Kuo Liang Peng
(74) *Attorney, Agent, or Firm* — Greenblum & Bernstein, P.L.C.

(57) ABSTRACT

A corona-resistant resin composition and a corona-resistant member, having sufficient durability relative to corona discharge, are provided. A corona-resistant resin composition obtained, at least, by melt kneading 7 to 80 parts by mass of a silicone-based polymer per 100 parts by mass of a resin component, and a corona-resistant member formed by molding the corona-resistant resin composition, are disclosed. A polyarylene sulfide resin or a polybutylene terephthalate resin may be used as the resin component.

13 Claims, 1 Drawing Sheet

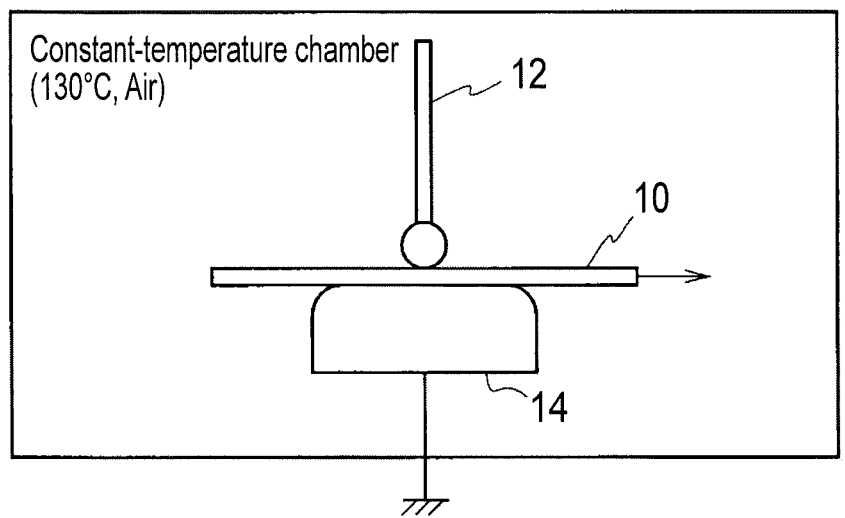

CORONA-RESISTANT RESIN COMPOSITION, METHOD FOR DEVELOPING CORONA RESISTANCE OF RESIN COMPOSITION, AND CORONA-RESISTANT MEMBER

TECHNICAL FIELD

The present invention relates to a corona-resistant resin composition that exhibits durability relative to corona discharge, a method for developing corona resistance of a resin composition, and a corona-resistant member formed by molding the corona-resistant resin composition.

BACKGROUND ART

In recent years, in electrical equipment, various resin molded items have been used in housings and internal electrical system components. Examples of electrical equipment include not only typical household electrical appliances and industrial electrical appliances, but also, for example, equipment controlling the electrical systems in vehicles such as automobiles, motorcycles and trucks, and resin molded items are also widely used in this type of electrical equipment. For electrical equipment used inside vehicles, and particularly for resin molded items used in equipment disposed inside engine rooms, items capable of withstanding corona discharge caused by the ignition coils or the like are required. In other words, when a resin molded item is exposed to a corona discharge, a tree-shaped localized failure known as an electrical tree develops and shortens the lifespan of the resin molded item, and this must be prevented.

On the other hand, because resins used in electrical equipment inside vehicles also require heat resistance and flame retardancy and the like, polyarylene sulfide resins (hereafter also referred to as "PAS resins") that exhibit the required performance are often used. However, on their own, PAS resins do not provide sufficient corona resistance, and therefore various proposals have been made for imparting resin molded items (compositions) with corona resistance (for example, see Patent Documents 1 to 3).

Patent Document 1 discloses a material (a biaxially oriented film) formed from a polyphenylene sulfide (hereafter also referred to as a "PPS resin") in which the corona resistance has been improved by ensuring that the sodium chloride content is not more than 0.5% by weight.

Further, Patent Documents 2 and 3 disclose molded items (a cable component and a snow adhesion-resistant ring) formed from resin compositions containing a PAS resin, a conductive carbon black, graphite and an epoxy group-containing α-olefin-based copolymer. These items aim to provide corona resistance, in addition to various other properties such as heat resistance, weather resistance, flame retardancy, water repellency, airtightness and toughness, by setting the volume resistivity of the resin composition to an appropriate value.

The resin compositions (molded items) disclosed in Patent Documents 1 to 3 are able to provide a corona resistance effect of at least a certain level, but the corona resistance is not entirely satisfactory, and there remains room for further improvement.

On the other hand, resin compositions containing a PAS resin and also containing a silicone-based polymer such as a polysiloxane for the purpose of improving various properties of the resin composition are also known (for example, see Patent Documents 4 to 6). The resin composition disclosed in Patent Document 4 is designed to obtain superior water repellency, the resin composition disclosed in Patent Document 5 provides improved flame retardancy, and the resin composition disclosed in Patent Document 6 is designed to obtain superior mechanical strength and chemical resistance. In other words, none of the resin compositions disclosed in Patent Documents 4 to 6 aims to provide corona resistance. Currently, no composition is known that provides improved corona resistance by combining a PAS resin and a silicone-based polymer.

CITATION LIST

Patent Documents

Patent Document 1: JP S59-79903 A
Patent Document 2: JP H11-53943 A
Patent Document 3: JP H11-150848 A
Patent Document 4: JP H08-231852 A
Patent Document 5: JP 2007-119527 A
Patent Document 6: JP 2011-111468 A

SUMMARY OF INVENTION

Problem to be Solved by the Invention

The present invention has been developed in light of the conventional problems described above, and has an object of providing a corona-resistant resin composition having sufficient durability relative to corona discharge, a method for developing corona resistance of a resin composition, and a corona-resistant member.

Solution to Problem

The present invention for achieving the object described above, is as follows.

(1) A corona-resistant resin composition obtained, at least, by melt kneading 7 to 80 parts by mass of a silicone-based polymer per 100 parts by mass of a resin component.

(2) The corona-resistant resin composition disclosed above in (1), wherein the resin Component is a polyarylene sulfide resin or a polybutylene terephthalate resin.

(3) The corona-resistant resin composition disclosed above in (1) or (2), wherein Glass fiber is also added and melt kneaded.

(4) A method for developing corona resistance of a resin composition, wherein, in a resin composition, 7 to 80 parts by mass of a silicone-based polymer per 100 parts by mass of a resin component is added, thereby developing corona resistance.

(5) A corona-resistant member formed by molding the corona-resistant resin composition disclosed, above in any one of (1) to (3).

(6) The corona-resistant member disclosed above in (5), wherein, when the corona-resistant member is inspected using a scanning electron microscope, the corona resistant member shows that domains of the silicone-based polymer are interspersed within a matrix of the resin component, and an average dispersed diameter of the silicone-based polymer within the matrix of the resin component, when measured using an image captured using the scanning electron microscope, is at least 0.1 μm but not more than 20 μm.

(7) The corona-resistant member disclosed above in (5) or (6), wherein the corona-resistant member has a sheet-like form, a plate-like form, a cylindrical form, or a coating-like form.

Effects of Invention

According to the present invention, it is possible to provide a corona-resistant resin composition that has sufficient durability relative to corona discharge, a method for developing corona resistance of a resin composition, and a corona-resistant member.

BRIEF DESCRIPTION OF DRAWINGS

FIG. 1 is a conceptual diagram illustrating the arrangement of a test piece and each of the electrodes in a corona resistance test.

EMBODIMENTS FOR CARRYING OUT THE INVENTION

<Corona-Resistant Resin Composition>

The corona-resistant resin composition of the present invention is obtained by melt kneading 7 to 80 parts by mass of a silicone-based polymer per 100 parts by mass of a resin component.

Each of the components of the corona-resistant resin composition of the present invention is described below in detail.

[Resin Component]

There are no particular limitations on the resin component, and examples include polyethylene resins, polypropylene resins, polyamide resins, polyacetal resins, modified polyphenylene ether resins, polyethylene terephthalate resins, polybutylene terephthalate resins, polyethylene naphthalate resins, polyarylene sulfide resins, polyimide resins, polyamide imide resins, polyether imide resins, polysulfone resins, polyether sulfone resins, polyether ketone resins, polyether ether ketone resins, liquid crystal resins, fluororesins, thermoplastic elastomers, and various types of biodegradable resins. Two or more resin components may be used in combination. Among the above resins, polyarylene sulfide resins, polybutylene terephthalate resins (hereafter also referred to as "PBT resins"), polyacetal resins, and liquid crystal resins and the like are collectively referred to as engineering plastics due to their excellent mechanical properties, electrical properties, heat resistance, and other physical and chemical properties, as well as their good processability, and these engineering plastics are used in a wide range of applications including automobiles, and electrical and electronic componentry.

PAS resins and PBT resins are described below in sequence.

(Polyarylene Sulfide Resins)

A PAS resin is a polymer compound configured mainly with a repeating unit represented by —(Ar—S)— (wherein Ar represents an arylene group), and in the present invention, PAS resins having typically known molecular structures can be used.

Examples of the aforementioned arylene group include a p-phenylene group, a m-phenylene group, an o-phenylene group, a substituted phenylene group, a p,p'-diphenylene sulfone group, a p,p'-biphenylene group, a p,p'-diphenylene ether group, a p,p'-diphenylene carbonyl group and a naphthalene group. The PAS resin may be a homopolymer composed solely of the above repeating unit, but a copolymer also including a different type of repeating unit described below may sometimes be preferred in terms of processability and the like.

As a homopolymer, a polyphenylene sulfide resin having, as the repeating unit, a p-phenylene sulfide group, in which a p-phenylene group is used as the arylene group, can be used favorably. As a copolymer, a copolymer of combinations of two or more mutually different arylene sulfide groups each of which is configured with any of the aforementioned arylene groups may be used, and combinations including a p-phenylene sulfide group and a m-phenylene sulfide group can be used particularly favorably. Among such combinations, those including at least 70 mol %, and preferably 80 mol % or more, of p-phenylene sulfide group are suitable in terms of properties such as the heat resistance, moldability and mechanical properties. Furthermore, among these PAS resins, high molecular weight polymers with substantially linear structures, obtained by condensation polymerization of a monomer configured mainly with a difunctional halogenated aromatic compound, are particularly preferred. As the PAS resin used in the present invention, a mixture of two or more PAS resins having different molecular weights may be used.

Examples of PAS resins other than those having a linear structure include polymers with a partially branched structure or crosslinked structure formed using a small amount of a monomer such as a polyhalogenated aromatic compound having three or more halogen substituents during condensation polymerization, and polymers with improved molding processability obtained by heating a low-molecular weight polymer having a linear structure at a high temperature in the presence of oxygen or the like to increase the melt viscosity via oxidative crosslinking or thermal crosslinking.

The melt viscosity (310° C., shear velocity: 1216 $sec^{-1}$) of the PAS resin that functions as the base resin used in the present invention is preferably not more than 600 Pa·s or less. The preferable range of the melt viscosity may also be applied to cases in which the mixed system described above is used. In particular, PAS resins having a melt viscosity in a range from 8 to 300 Pa·s are particularly preferred since they exhibit excellent balance between the mechanical properties and the fluidity.

(Polybutylene Terephthalate Resins)

A PBT resin is a polybutylene terephthalate-based resin obtained by polycondensation of a dicarboxylic acid component including at least terephthalic acid or an ester-forming derivative thereof (such as a lower alcohol ester) and a glycol component including at least an alkylene glycol having four carbon atoms (1,4-butanediol) or an ester-forming derivative thereof (such as an acetylated product thereof). The PBT resin is not limited to homo PBT resins, and may also be a copolymer (copolymer PBT resin) including at least 60 mol % (and in particular, at least 75 mol % but not more than 95 mol %) of butylene terephthalate units.

With respect to the copolymer PBT resins, examples of the dicarboxylic acid component other than the terephthalic acid or ester-forming derivative thereof (comonomer component) aromatic dicarboxylic acid components (examples thereof including $C_6$ to $C_{12}$ aryl dicarboxylic acids such as isophthalic acid, phthalic acid, naphthalenedicarboxylic acid and diphenyl ether dicarboxylic acid), aliphatic dicarboxylic acid components (examples thereof including $C_4$ to $C_{16}$ alkyldicarboxylic acids such as succinic acid, adipic acid, azelaic acid and sebacic acid, and $C_5$ to $C_{10}$ cycloalkyldicarboxylic acids such as cyclohexanedicarboxylic acid), and ester-forming derivatives of these dicarboxylic acid components. One of these dicarboxylic acid components may be used singly, or two or more thereof may be used in combination.

Preferred examples of dicarboxylic acid components (comonomer components) include aromatic dicarboxylic acid components (particularly $C_6$ to $C_{10}$ aryl dicarboxylic acids such as isophthalic acid), and aliphatic dicarboxylic acid components (particularly $C_6$ to $C_{12}$ alkyldicarboxylic acids such as adipic acid, azelaic acid and sebacic acid).

With respect to the PBT resins, examples of the glycol component other than 1,4-butanediol (comonomer component) include aliphatic diol components (for example, alkylene glycols (examples thereof including $C_2$ to $C_{10}$ alkylene glycols such as ethylene glycol, propylene glycol, trimethylene glycol, 1,3-butylene glycol, hexamethylene glycol; neopentyl glycol and 1,3-octanediol, and polyoxy $C_2$ to $C_4$ alkylene glycols such as diethylene glycol, triethylene glycol and dipropylene glycol), and alicyclic diols such as cyclohexane dimethanol and hydrogenated bisphenol A), aromatic diol components (including aromatic alcohols such as bisphenol A and 4,4-dihydroxybiphenyl, and $C_2$ to $C_4$ alkylene oxide adducts of bisphenol A (such as ethylene oxide 2 mol adducts of bisphenol A and propylene oxide 3 mol adducts of bisphenol A)), and ester-forming derivatives of the above compounds. One of these glycol components may be used singly, or two or more thereof may be used in combination.

Examples of preferred glycol components (comonomer components) include aliphatic diol components (particularly $C_2$ to $C_6$ alkylene glycols, polyoxy $C_2$ to $C_3$ alkylene glycols such as diethylene glycol, and alicyclic diols such as cyclohexanone dimethanol).

Either a homo PBT resin or copolymer PBT resin produced by polycondensation using one or more of the aforementioned compounds as a monomer component can be used as the resin component of the present invention. A homo PBT resin or copolymer PBT resin may be used singly, or two or more PBT resins may be used in combination.

[Silicone-Based Polymer]

The corona-resistant resin composition of the present invention is obtained by melt kneading the resin component and a silicone-based polymer, and this silicone-based polymer contributes to an improvement in the corona resistance.

Examples of the silicone-based polymer include silicone-acrylic core-shell rubbers, polyorganosiloxanes, silicone composite powders and silicone-acrylic copolymers, and examples of the organopolysiloxanes include polydimethylsiloxane, polymethylphenylsiloxane, and poly(dimethylsiloxane-diphenylsiloxane) copolymers, Modified polyorganosiloxanes in which a portion of the polyorganosiloxane has been modified with a hydroxyl group, an amino group, a carboxyl group, an epoxy group, a methacryloxy group, or a mercapto group or the like may be used. Among these, in terms of achieving a superior corona resistance effect, a silicone-acrylic core-shell rubber, a silicone composite powder or a silicone-acrylic copolymer is preferred.

Examples of silicone-based polymers (commercially available polymers) that can be used in the present invention include silicone-acrylic core-shell rubbers such as KANE ACE MR-01 manufactured by Kaneka Corporation. Further, examples of polyorganosiloxanes include DOW CORNING TORAY DY 33-315 manufactured by Dow Corning Toray Co., Ltd. Moreover, examples of silicone composite powders include KMP-600 manufactured by Shin-Etsu Chemical Co., Ltd., and examples of silicone-acrylic copolymers include R-181S manufactured by Nissin Chemical Co., Ltd.

In the corona-resistant resin composition of the present invention, from the viewpoint of obtaining sufficient corona resistance, the amount of the silicone-based polymer is from 7 to 80 parts by mass per 100 parts by mass of the resin component, and this amount is preferably from 15 to 80 parts by mass, more preferably from 20 to 80 parts by mass, and particularly preferably from 30 to 80 parts by mass. If the amount is less than 7 parts by mass, then the corona resistance effect tends to decrease, whereas if the amount exceeds 80 parts by mass, then the composition cannot be extruded in a strand-like form, and pelletizing tends to become problematic.

[Glass Fiber]

In the corona-resistant resin composition of the present invention, glass fiber may also be added and melt kneaded. Because glass fiber itself has a corona-resistance improvement effect, the addition of glass fiber can further improve the corona resistance effect. Further, it is presumed that a synergistic effect is also obtained as a result of combining the silicone-based polymer and the glass fiber, with the corona resistance effect sometimes improving more than the sum of the individual effects obtained by adding one of the silicone-based polymer or the glass fiber singly.

There are no particular limitations on the glass fiber used in the present invention, and commercially available fibers may be used. Examples of commercially available glass fibers include chopped glass fiber (ECS03T-790DE, average fiber diameter: 6 μm) manufactured by Nippon Electric Glass Co., Ltd., chopped glass fiber (CS03DE416A, average fiber diameter: 6 μm) manufactured by Owens Corning, chopped glass fiber (ECS03T-747H, average fiber diameter: 10 μm) manufactured by Nippon Electric Glass Co., Ltd., and chopped glass fiber (ECS03T-747, average fiber diameter: 13 μm) manufactured by Nippon Electric Glass Co., Ltd.

[Other Components]

The corona-resistant resin composition of the present invention may also contain any of lubricants, carbon blacks, nucleating agents, flame retardants, flame retardant auxiliaries, antioxidants, metal deactivators, other age resistors, UV absorbers, stabilizers, plasticizers, pigments, dyes, colorants, antistatic agents, foaming agents, other polymers such as resins, and other additives, provided that they do not impair the effects of the present invention.

<Method for Developing Corona Resistance of Resin Composition>

The method for developing corona resistance of a resin composition according to the present invention involves, in the resin composition, adding 7 to 80 parts by mass of a silicone-based polymer per 100 parts by mass of the resin component, thereby developing corona resistance.

As described above, the corona-resistant resin composition of the present invention is imparted with corona resistance by adding a prescribed amount of a silicone-based polymer. In other words, by adding a prescribed amount of the silicone-based polymer to a resin composition, corona resistance can be developed, in the resin composition.

The resin and the silicone-based polymer in the method for developing corona resistance of a resin composition according to the present invention are the same as the resin and the silicone-based polymer in the corona-resistant resin composition of the present invention described above, and preferred examples and amounts for each of the components and other components which may be added in order to develop corona resistance are also the same as described above.

<Corona-Resistant Member>

The corona-resistant member of the present invention is formed by molding the aforementioned corona-resistant resin composition of the present invention, and has excellent corona resistance.

Further, when the corona-resistant member of the present invention is inspected using a scanning electron microscope, it is preferable that the corona-resistant member shows that domains of the silicone-based polymer are interspersed within a matrix of the resin component, and that the average dispersed diameter of the silicone-based within the matrix of the resin component, when measured using an image captured using the scanning electron microscope, is at least 0.1 µm but not more than 20 µm. In a case in which the dispersed diameter is within this range, the corona resistance effect can be further improved. This dispersed diameter preferably has an average of at least 0.1 µm but not more than 15 µm, and particularly preferably an average of at least 0.1 µm but not more than 7 µm. The smaller the dispersed diameter, the larger the specific surface area becomes, and the greater the labyrinth effect, resulting in a further improvement in the corona resistance effect.

The specific method used for measuring the average dispersed diameter using the scanning electron microscope is described below in the Examples section.

There are no particular limitations on the method used for preparing the corona-resistant member using the corona-resistant resin composition of the present invention, and known methods may be employed. For example, the corona-resistant resin composition of the present invention may be fed into an extruder, subjected to melt kneading and pelletizing, and the resulting pellets then fed into an injection molding apparatus equipped with a prescribed mold, and injection-molded to prepare the corona-resistant member.

The corona-resistant member of the present invention can be used as a member that requires corona resistance. Examples of this type of member include housings for ignition coils, insulated wiring, and electrical insulation sheets.

EXAMPLES

The present invention is described below in further detail based on a series of examples, but the present invention is not limited by the following examples.

Examples 1 to 12, Comparative Examples 1 to 7

In each of the examples and comparative examples, a mixture obtained by dry-blending the raw material components shown in Table 1 and Table 2 was fed into a twin screw extruder with a cylinder temperature of 320° C. (the glass fiber was added separately via a side feed portion of the extruder), subjected to melt kneading, and then pelletized. Details of each of the raw material components shown in Table 1 and Table 2 are described below. Examples 1 to 4 and Comparative Examples 1 to 3 in Table 1 are all examples in which glass fiber was not used, whereas Examples 5 to 12 and Comparative Examples 4 to 7 in Table 2 are all examples in which glass fiber was used.

(1) PAS Resin Component
PPS resin: FORTRON KPS W214A manufactured by Kureha Corporation (melt viscosity: 130 Pa·s (shear velocity: 1216 sec$^{-1}$, 310° C.))

The melt viscosity of the above PPS resin was measured in the following manner.
(Measurement of Melt Viscosity of PPS Resin)
Using a Capilograph manufactured by Toyo Seiki Seisaku-Sho, Ltd., the melt viscosity was measured at a barrel temperature of 310° C. and a shear velocity of 1216 sec$^{-1}$, using a 1 mmφ×20 mmL/flat die as a capillary.

(2) Other Resin Components
Silicone-based polymer 1: KANE ACE MR-01 (a silicone-acrylic core-shell rubber) manufactured by Kaneka Corporation
Silicone-based polymer 2: DOW CORNING TORAY DY 33-315 (a polyorganosiloxane) manufactured by Dow Corning Toray Co., Ltd.
Silicone-based polymer 3: KMP-600 (a silicone composite powder) manufactured by Shin-Etsu Chemical Co., Ltd.
Silicone-based polymer 4: R-181S (a silicone-acrylic copolymer) manufactured by Nissin Chemical Co., Ltd.
Olefin-based polymer: NUC-6570 (an ethylene-ethyl acrylate copolymer) manufactured by Nippon Unicar Co., Ltd.

(3) Filler
Glass fiber: chopped glass fiber, ECS03T-790DE, average fiber diameter: 6 µm, manufactured by Nippon Electric Glass Co., Ltd.

From the pellets prepared in the manner described above, a test piece (flat plate) having a length of 80 mm, a width of 80 mm and a thickness of 1 mm was prepared at a cylinder temperature of 320° C. and a mold temperature of 150° C. using an injection molding apparatus (SE100D manufactured by Sumitomo Heavy Industries, Ltd. and the following evaluations were then performed.

(Corona Resistance Test)
A test piece 10 prepared in each of the examples and comparative examples was secured between a high-voltage side electrode 12 (φ9.5 mm) and an earth side electrode 14 (φ25 mm) as illustrated in FIG. 1, an applied voltage of 18 kV was applied in the open air at a temperature of 130° C. and a frequency of 200 Hz using a withstand voltage tester (YST-243WS-28 manufactured by Yamayo Shikenki Co., Ltd.), and the time taken for dielectric breakdown to occur was measured. The measurement results are shown in Table 1 and Table 2.

In Comparative Example 3, prior to preparation of the test piece, the composition was not able to be extruded into a strand-like form or pelletized, and therefore the corona resistance test could not be performed.

(Measurement of Average Dispersed Diameter)
In Examples 7, 10, 12 and 13, the average dispersed diameter of the silicone-based polymer in the molded item was measured in the following manner.

From the pellets prepared in the above examples, a test piece (flat plate) having a length of 80 mm, a width of 80 mm and a thickness of 1 mm was molded at a cylinder temperature of 320° C. and a mold temperature of 150° C. using an injection molding apparatus (SE100D manufactured by Sumitomo Heavy Industries, Ltd.), the test piece was then fractured by impact in liquid nitrogen (fractured using nippers while immersed in liquid nitrogen), and the central region of the brittle fracture surface was inspected using a scanning electron microscope (SEM) S-4700 manufactured by Hitachi, Ltd. Subsequently, images were captured for two randomly selected locations within the inspected region, and a total of 25 particles (silicone-based polymer domains) were selected randomly from the two acquired images (SEM images). The particle diameter of each of the 25 particles was measured using a ruler, and the numerical value obtained by dividing the sum of all of the measured particle diameters by 25 was recorded as the average dispersed diameter.

TABLE 1

| | | Comparative Example 1 | Comparative Example 2 | Example 1 | Example 2 | Comparative Example 3 | Example 3 | Example 4 |
|---|---|---|---|---|---|---|---|---|
| PAS resin component (parts by mass) | PPS resin | 100 | 100 | 100 | 100 | 100 | 100 | 100 |
| Other resin components (parts by mass) | Olefin-based polymer | — | 17.2 | — | — | — | — | — |
| | Silicone-based polymer 1 | — | — | 20.3 | 35.7 | 88.7 | — | — |
| | Silicone-based polymer 2 | — | — | — | — | — | 18.1 | 30.0 |
| Corona resistance test (hours) | | 12 | 12 | 37 | 84 | — | 26 | 56 |

TABLE 2

| | | Comparative Example 4 | Comparative Example 5 | Comparative Example 6 | Comparative Example 7 | Example 5 | Example 6 | Example 7 |
|---|---|---|---|---|---|---|---|---|
| PAS resin component (parts by mass) | PPS resin | 100 | 100 | 100 | 100 | 100 | 100 | 100 |
| Other resin components (parts by mass) | Silicone-based polymer 1 | — | — | 2.6 | 6.1 | 9.0 | 20.3 | 35.6 |
| | Silicone-based polymer 2 | — | — | — | — | — | — | — |
| | Silicone-based polymer 3 | — | — | — | — | — | — | — |
| | Silicone-based polymer 4 | — | — | — | — | — | — | — |
| Filler (parts by mass) | Glass fiber | 25.0 | 30.0 | 25.6 | 26.5 | 27.2 | 30.1 | 33.9 |
| Corona resistance test (hours) | | 51 | 51 | 52 | 64 | 81 | 98 | 201 |
| Average dispersed diameter of silicone-based polymer in molded item (μm) | | — | — | — | — | — | 1.0 | — |

| | | Example 8 | Example 9 | Example 10 | Example 11 | Example 12 |
|---|---|---|---|---|---|---|
| PAS resin component (parts by mass) | PPS resin | 100 | 100 | 100 | 100 | 100 |
| Other resin components (parts by mass) | Silicone-based polymer 1 | 53.8 | — | — | — | — |
| | Silicone-based polymer 2 | — | 18.0 | 31.1 | — | — |
| | Silicone-based polymer 3 | — | — | — | 18.2 | — |
| | Silicone-based polymer 4 | — | — | — | — | 18.9 |
| Filler (parts by mass) | Glass fiber | 38.5 | 29.5 | 32.8 | 29.5 | 29.7 |
| Corona resistance test (hours) | | at least 1040 | 57 | 70 | 94 | 101 |
| Average dispersed diameter of silicone-based polymer in molded item (μm) | | — | 10.6 | — | 4.0 | 2.1 |

From Table 1, it is evident that in Examples 1 to 4, which used a silicone-based polymer, durability was achieved for a long period exceeding 25 hours in the corona resistance test. In contrast, in Comparative Examples 1 and 2, the test results were less than 25 hours, and satisfactory results could not be obtained.

Moreover, comparing Comparative Example 1 with Examples 1 and 2, or comparing Comparative Example 1 with Examples 3 and 4, it is evident that increasing the amount added of the silicone-based polymer improves the corona resistance. However, from the results for Comparative Example 3, it is clear that if the amount added exceeds 80 parts by mass per 100 parts by mass of the resin component, then even pellet preparation becomes impossible.

Further, the results in Table 2 reveal the following. First, comparing Comparative Example 1 (Table 1) with Comparative Examples 4 and 5, which differ only in terms of the presence or absence of the glass fiber, it is clear that using glass fiber improves the corona resistance. Further, Examples 5 to 12 are examples in which combinations of glass fiber and a silicone-base polymer were used, and it is evident that compared with Comparative Examples 4 and 5, in which no silicone-based polymer was used, the corona resistance was able to be further improved. Comparing Comparative Example 1, Example 1 and Comparative Example 5 with Example 6, it is evident that in a combined system containing both a silicone-acrylic core-shell rubber and glass fiber, the corona resistance improved considerably more than the sum of the individual corona resistance effects (namely, the sum of the corona resistance test results (hours)) obtained when the two components each were added singly. It is presumed that this indicates a synergistic effect resulting from the combination of the silicone-based polymer and the glass fiber.

Moreover, comparing Comparative Examples 4 to 7 with Examples 5 to 8, or comparing Comparative Example 5 with Examples 9 and 10, it is evident that, in a similar manner to that observed in systems containing only a silicone-based polymer, in combined systems containing both glass fiber and a silicone-based polymer, increasing the amount added of the silicone-based polymer improves the corona resistance. Among the various examples, the corona resistance effect was particularly dramatic in Examples 6 to 8. These results indicate that the point where the amount added of the silicone-acrylic core-shell rubber exceeds 30 parts by mass or a point in the vicinity thereof is a critical point, and when the amount added exceeds this critical point, the corona resistance effect improves dramatically.

In addition, comparing Examples 6, 9, 11 and 12, in which a substantially similar amount of a silicone-based polymer was used, it is evident that using a silicone-acrylic core-shell rubber, a silicone composite powder or a silicone-acrylic copolymer as the silicone-based polymer yields a particularly superior corona resistance effect.

On the other hand, comparing Examples 6, 9, 11 and 12, for which the average dispersed diameter of the silicone-based polymer in the molded item was measured, it is evident that a smaller average dispersed diameter yields improved corona resistance.

REFERENCE SIGNS LIST

10: Test piece
12: High-voltage side electrode
14: Earth side electrode

The invention claimed is:

1. A corona-resistant resin composition obtained by, at least, melt kneading a mixture including a resin component and 7 to 80 parts by mass of at least one silicone-based polymer selected from the group consisting of a silicone-acrylic core-shell rubber and a silicone-acrylic copolymer per 100 parts by mass of the resin component, the resin component being a polyarylene sulfide resin.

2. The corona-resistant resin composition according to claim 1, wherein the mixture further includes glass fiber.

3. A corona-resistant member formed by molding the corona-resistant resin composition according to claim 1.

4. The corona-resistant member according to claim 3, wherein, when the corona-resistant member is inspected using a scanning electron microscope, the corona-resistant member shows that domains of the silicone-based polymer are interspersed within a matrix of the resin component, and an average dispersed diameter of the silicone-based polymer within the matrix of the resin component, when measured using an image captured using the scanning electron microscope, is at least 0.1 μm but not more than 20 μm.

5. The corona-resistant member according to claim 3, wherein the corona resistant member has a sheet-like form, a plate-like form, a cylindrical form, or a coating-like form.

6. The corona-resistant resin composition according to claim 1, wherein the silicone-based polymer includes a silicone-acrylic copolymer.

7. The corona-resistant resin composition according to claim 1, wherein the amount of the silicone-based polymer is 30 to 80 parts by mass per 100 parts by mass of the resin component.

8. The corona-resistant resin composition according to claim 1, wherein the silicon-based polymer includes a silicone-acrylic core-shell rubber.

9. A method for developing corona resistance of a resin composition, the method comprising adding 7 to 80 parts by mass of at least one silicone-based polymer selected from the group consisting of a silicone-acrylic core-shell rubber and a silicone-acrylic copolymer per 100 parts by mass of a resin component in a resin composition, thereby developing corona resistance, the resin component being a polyarylene sulfide resin.

10. The method according to claim 9, wherein the silicone-based polymer includes a silicone-acrylic copolymer.

11. The method according to claim 9, wherein the amount of the silicone-based polymer is 30 to 80 parts by mass per 100 parts by mass of the resin component.

12. The method according to claim 9, further comprising adding a grass fiber in the resin composition.

13. The method according to claim 9, wherein the silicone-based polymer includes a silicone-acrylic core-shell rubber.

* * * * *